(12) United States Patent
Dar

(10) Patent No.: US 12,553,291 B2
(45) Date of Patent: Feb. 17, 2026

(54) DRILL BITS AND METHODS OF FORMING AND REPAIRING DRILL BITS USING ADDITIVE MANUFACTURING

(71) Applicant: Baker Hughes Oilfield Operations LLC, Houston, TX (US)

(72) Inventor: Rebecca Dar, Magnolia, TX (US)

( * ) Notice: Subject to any disclaimer, the term of this patent is extended or adjusted under 35 U.S.C. 154(b) by 0 days.

(21) Appl. No.: 18/646,034

(22) Filed: Apr. 25, 2024

(65) Prior Publication Data

US 2025/0334006 A1 Oct. 30, 2025

(51) Int. Cl.
*E21B 10/46* (2006.01)
*B23P 15/28* (2006.01)
*B33Y 80/00* (2015.01)
*E21B 10/60* (2006.01)

(52) U.S. Cl.
CPC .............. *E21B 10/46* (2013.01); *B23P 15/28* (2013.01); *B33Y 80/00* (2014.12); *E21B 10/60* (2013.01)

(58) Field of Classification Search
CPC ................................................ E21B 10/00–66
See application file for complete search history.

(56) References Cited

U.S. PATENT DOCUMENTS

| | | | |
|---|---|---|---|
| 9,890,595 B2 | 2/2018 | Oxford et al. | |
| 10,335,855 B2 | 7/2019 | Welch et al. | |
| 10,386,801 B2 | 8/2019 | Oxford et al. | |
| 2010/0059986 A1* | 3/2010 | Kimoto | F16L 15/08 285/55 |
| 2017/0037518 A1 | 2/2017 | Oxford et al. | |
| 2018/0002986 A1* | 1/2018 | Zhang | E21B 10/43 |
| 2018/0058148 A1 | 3/2018 | Zhang et al. | |
| 2019/0032416 A1 | 1/2019 | Evans et al. | |
| 2019/0128072 A1 | 5/2019 | Griffo et al. | |
| 2021/0164295 A1 | 6/2021 | Xu et al. | |
| 2021/0291276 A1 | 9/2021 | Pelfrene et al. | |
| 2022/0235613 A1 | 7/2022 | Voglewede | |

FOREIGN PATENT DOCUMENTS

WO 2012/071449 A2 5/2012

OTHER PUBLICATIONS

International Search Report for Application No. PCT/US2025/022290 dated Jul. 24, 2025, 4 pages.
International Written Opinion for Application No. PCT/US2025/022290 dated Jul. 24, 2025, 5 pages.

* cited by examiner

*Primary Examiner* — Kristyn A Hall
(74) *Attorney, Agent, or Firm* — Baker Hughes Company

(57) ABSTRACT

A downhole earth-boring rotary drill bit comprises a bit body. The bit body comprises a crown region, a plurality of cutting elements on the crown region, and wherein the bit body comprises a first gradient of at least two materials between an external surface of the crown region and an internal structure of the bit body and methods of forming and repairing the downhole earth-boring rotary drill bit using additive manufacturing.

20 Claims, 8 Drawing Sheets

DRILL BITS AND METHODS OF FORMING AND REPAIRING DRILL BITS USING ADDITIVE MANUFACTURING

TECHNICAL FIELD

Embodiments of the present disclosure generally relate to earth-boring operations. In particular, embodiments of the present disclosure relate to drill bits, and related systems, apparatus, and methods.

BACKGROUND

Earth-boring tools are used to form boreholes (e.g., wellbores) in subterranean formations. Such earth-boring tools include, for example, drill bits, reamers, mills, etc. Drill bits may be a rolling-cutter bit or a fixed-cutter bit. For example, a rolling-cutter bit may have one or more cones configured to be individually rotated as the bit body is rotated. A fixed-cutter earth-boring rotary drill bit (often referred to as a "drag" bit) generally includes a plurality of cutting elements secured to a face of a bit body of the drill bit. The cutters are fixed in place when used to cut formation materials. A conventional fixed-cutter earth-boring rotary drill bit includes a bit body having generally radially projecting and longitudinally extending blades. During drilling operations, the drill bit is positioned at the bottom of a well borehole and rotated.

Earth-boring tool bodies, such as drag bits, may have complex internal and external geometries including, for example, internal fluid passageways and external blades with pockets for cutting elements. Earth-boring tool bodies may be formed from metal alloys such as steel. Such bits may, for example, be formed by machining (e.g., milling, turning) a metal blank to the desired geometry. Some earth-boring tool bodies may be designed for single use purposes, such as casing bits. Casing bits are conventionally made of low alloy steel and require significant subtractive manufacturing to produce their final shape and dimensions.

Other earth-boring tool bodies may be designed to be reused multiple times, such as polycrystalline diamond compact (PDC) bits. During the post-machining processes of making or repairing a single use or multi-use earth boring tool body, wear-resistant materials may be applied to high-wear areas of the bit body, such as the blade surfaces, gage surfaces, junk slots (i.e., fluid courses between blades), and areas adjacent the cutter pockets. Examples of wear-resistant materials may include multi-phase materials, e.g., hard material particles dispersed within a metal alloy matrix, or may include substantially homogenous metal alloys, such as cobalt-chromium alloys. The wear-resistant material may be applied by, for example, welding or melting a rod comprising the wear resistant material with a torch or other heat source adjacent the areas of the tool body over which the wear-resistant material is desired after the tool body is formed.

BRIEF SUMMARY

Some embodiments of the present disclosure may include a downhole earth-boring rotary drill bit that comprises a bit body. The bit body may comprise a crown region, a plurality of cutting elements on the crown region, and one or more fluid passageways located internally within the bit body. The bit body comprises a first gradient of at least two materials between an external surface of the crown region and an internal structure of the bit body.

Another embodiment of the present disclosure may include a method of repairing a downhole earth-boring rotary drill bit. The method may include identifying one or more areas of the downhole earth-boring rotary drill bit to be repaired, selecting at least two materials to be used to form at least a portion of the downhole earth-boring rotary drill bit, and disposing a gradient of at least two materials over the one or more areas of the downhole earth-boring rotary drill bit to be repaired.

Another embodiment of the present disclosure may include a method of forming a downhole earth-boring rotary drill bit. The method may include identifying a structure of the rotary drag bit to be printed by an additive manufacturing process. The method may further include selecting at least two materials to be used to form at least a portion of the downhole earth-boring rotary drill bit and disposing the at least two materials in a layered pattern representing at least a portion of the downhole earth-boring rotary drill bit. The layered pattern may form a material gradient as more layers are added to the layered pattern.

DETAILED DESCRIPTION

Figure 1:
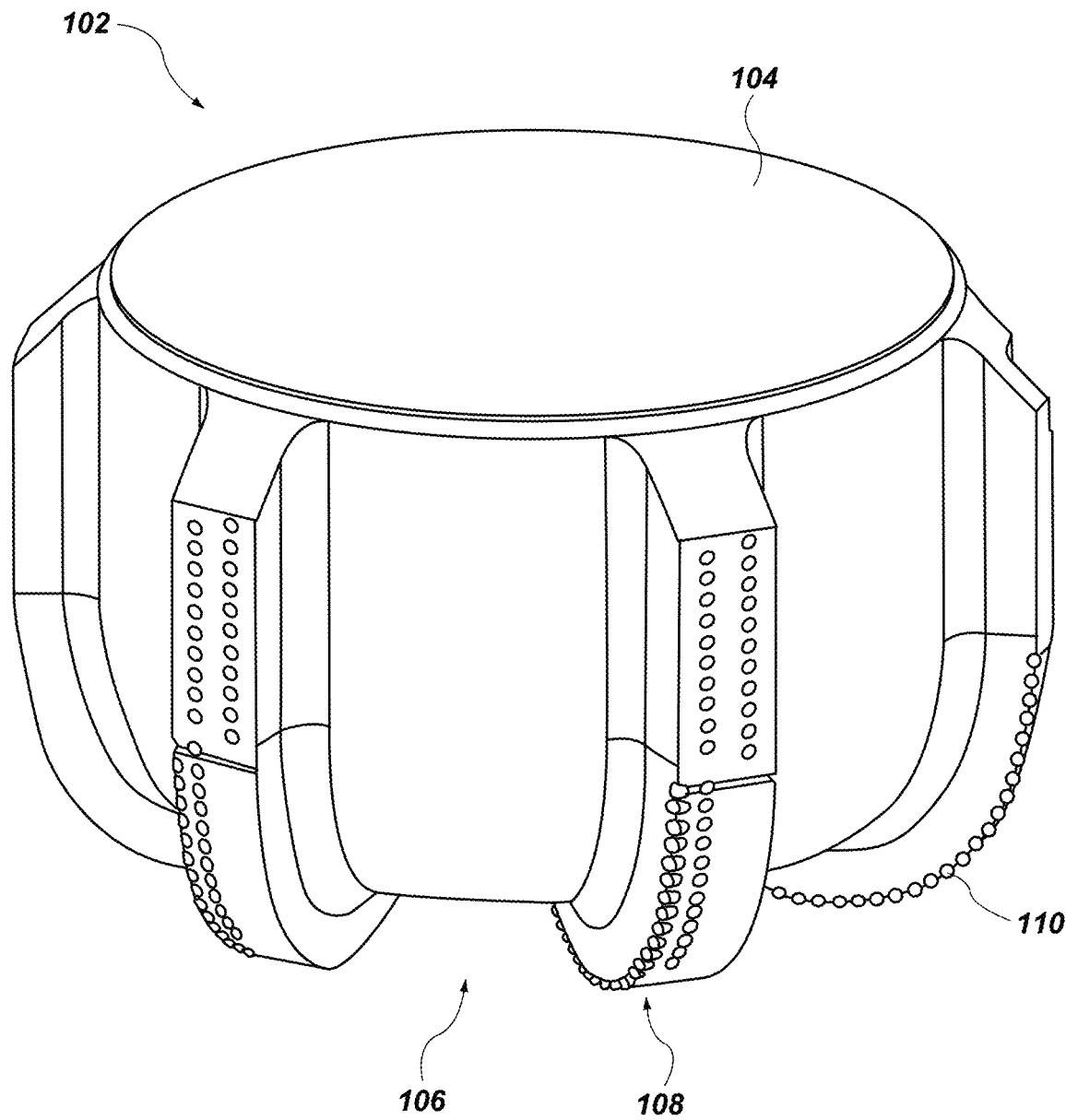
FIG. 1 illustrates a perspective view of a downhole earth-boring rotary drill bit in accordance with an embodiment of the present disclosure.

The illustrations presented herein are not meant to be actual views of any particular earth-boring system or component thereof, but are merely idealized representations employed to describe illustrative embodiments. The drawings are not necessarily to scale.

As used herein, the terms "earth-boring tool" means and includes any type of bit or tool used for drilling during the formation or enlargement of a wellbore in a subterranean formation. For example, earth-boring tools include fixed-cutter bits, roller cone bits, percussion bits, core bits, eccentric bits, bicenter bits, reamers, mills, drag bits, hybrid bits (e.g., rolling components in combination with fixed cutting elements), and other drilling bits and tools known in the art. Earth-boring tool may also include tool control components, such as, directional assemblies, stabilizers, motors, steering pads, etc.

The disclosure relates to methods of forming earth-boring tools using direct metal deposition manufacturing processes. For example, the disclosure relates to layer-by-layer application of metal material on surfaces of earth-boring tool components. In some embodiments, direct metal deposition processes may be used to form earth-boring tool components. In some embodiments, direct metal deposition processes may be used to apply material to partially formed earth-boring tool components (e.g., blanks including the shank of a rotary drill bit). In some embodiments, direct metal deposition processes may be used to repair earth-boring tool components by applying material to a worn portion of the earth-boring tool component.

As used herein, the term "direct metal deposition" means and includes any additive manufacturing processes in which material is applied to a component by at least partially melting a portion of the component to form a melt pool, introducing additional material to the melt pool, at least partially melting the additional material, and re-solidifying the melt pool and the additional material to form a raised feature on the component.

As used herein, the term "substantially" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or even at least about 100% met.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

A downhole earth-boring rotary drill bit 100 is used to form boreholes (e.g., wellbores) in subterranean formations. The type of downhole earth-boring rotary drill bit 100 utilized in any one downhole environment may depend on the type of borehole being drilled or the expected lifespan of the downhole earth-boring rotary drill bit 100. For example, the downhole earth-boring rotary drill bit 100 may be a single-use or multi-use bit. Single use bits may be left at the bottom of a borehole when drilling operations are complete. Multi-use bits may be brought back out of the borehole and reused multiple times. Downhole earth-boring rotary drill bits 100 and methods of forming downhole earth-boring rotary drill bits 100 that reduce production time and reduce production costs are discussed herein. The methods described herein also facilitate repairing of damaged downhole earth-boring rotary drill bits 100.

Figure 2:
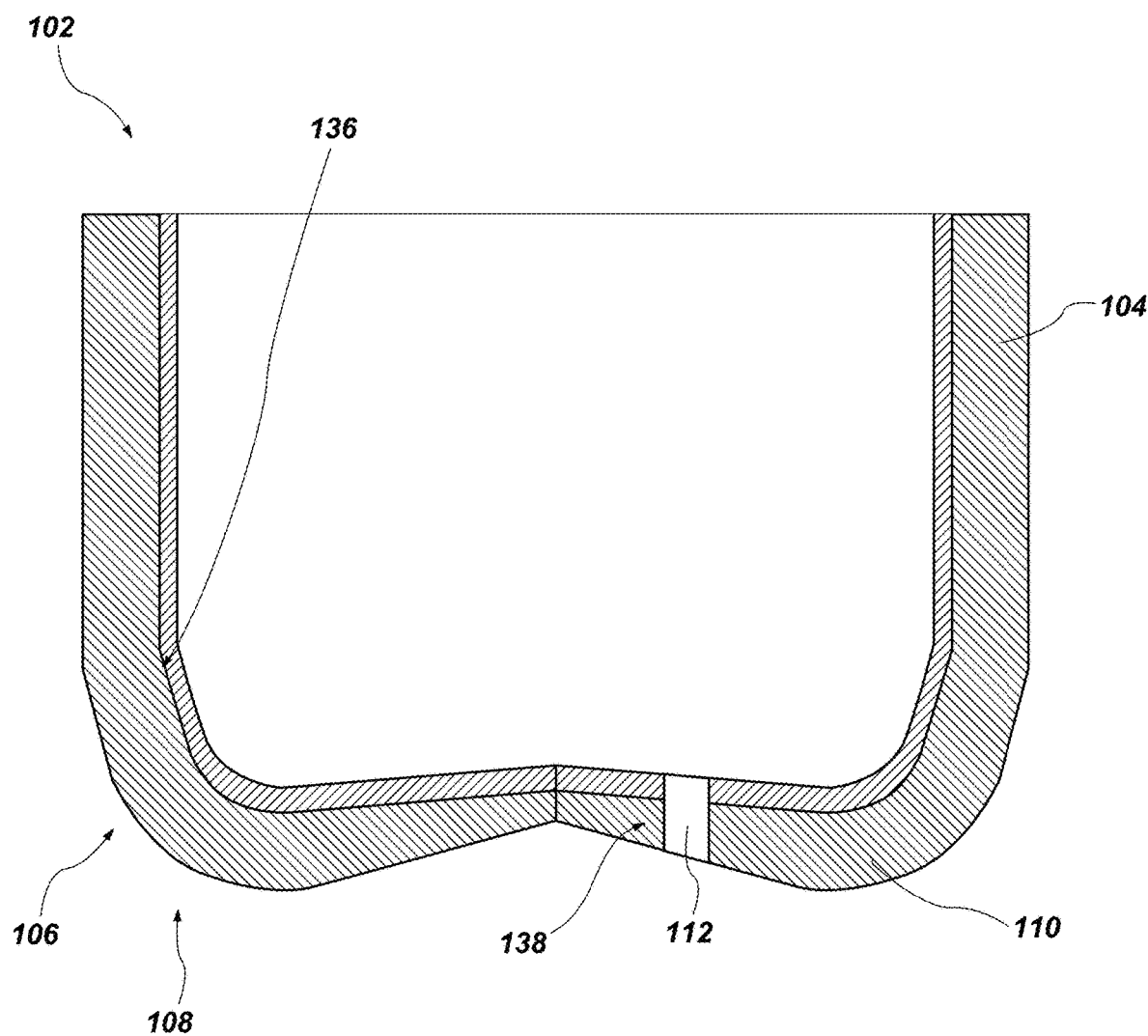
FIG. 2 illustrates a cross-sectional view of the downhole earth-boring rotary drill bit of FIG. 1.

FIGS. 1-2 show an embodiment of the downhole earth-boring rotary drill bit 100 as a casing bit 102. The casing bit 102 may include a bit body 104, a crown region 106 located at a first end 108 of the bit body 104, a plurality of blades 110 disposed over the crown region 106, and one or more fluid passageways 112 passing through the internal structure of the casing bit 102. The casing bit 102 is configured to be a single-use bit.

Figure 3:
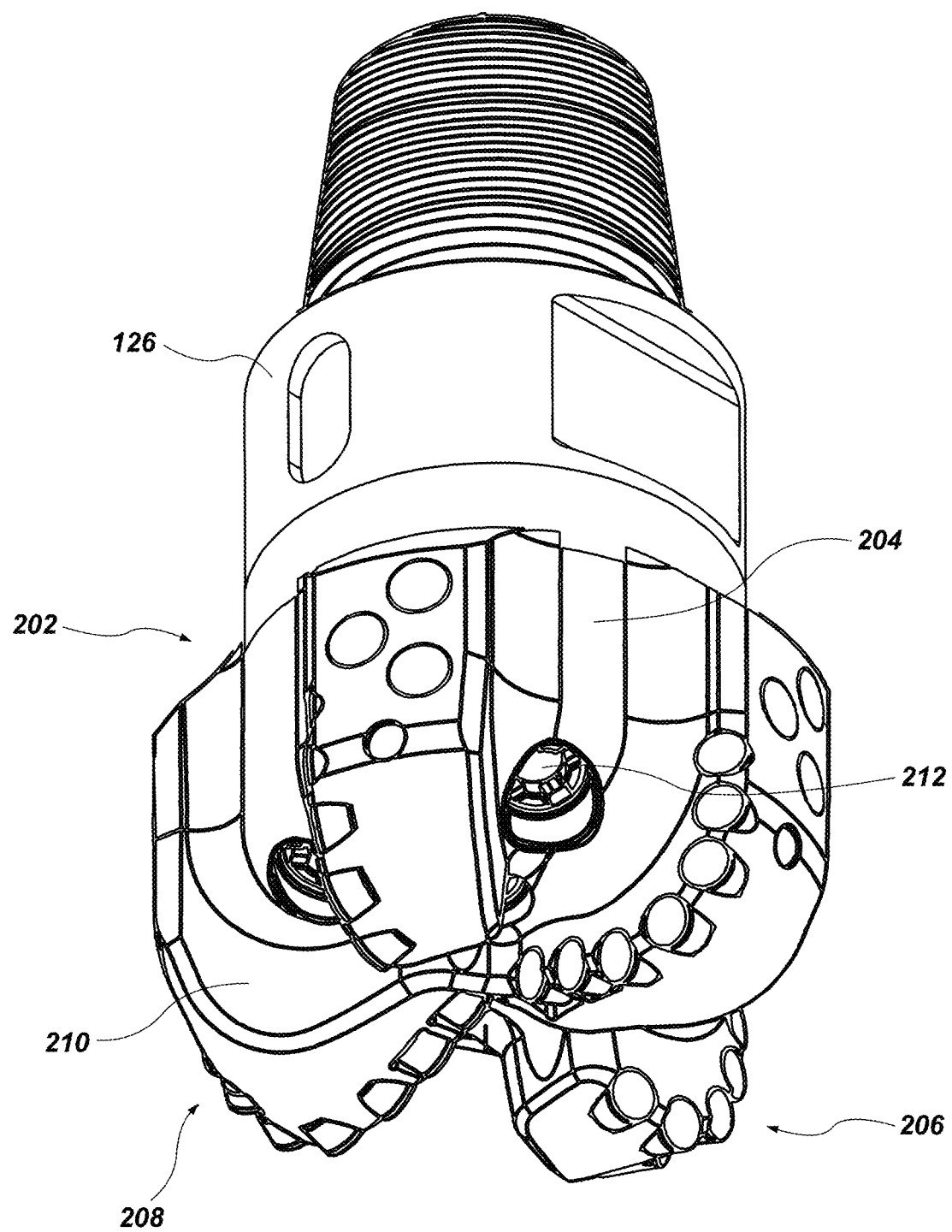
FIG. 3 illustrates a perspective view of a downhole earth-boring rotary drill bit in accordance with an embodiment of the present disclosure.
Figure 4:
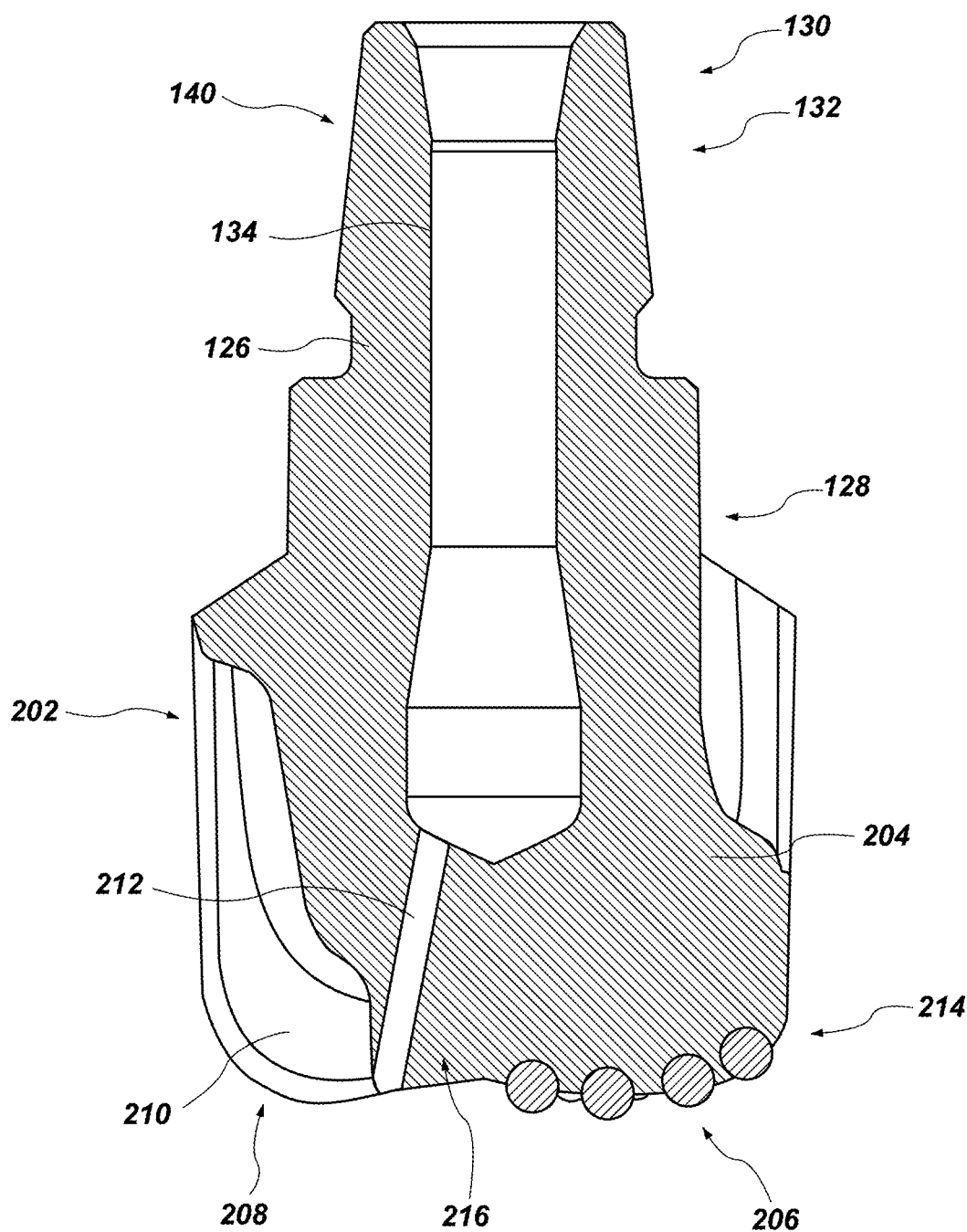
FIG. 4 illustrates a cross-sectional view of the downhole earth-boring rotary drill bit of FIG. 3.
Figure 5:
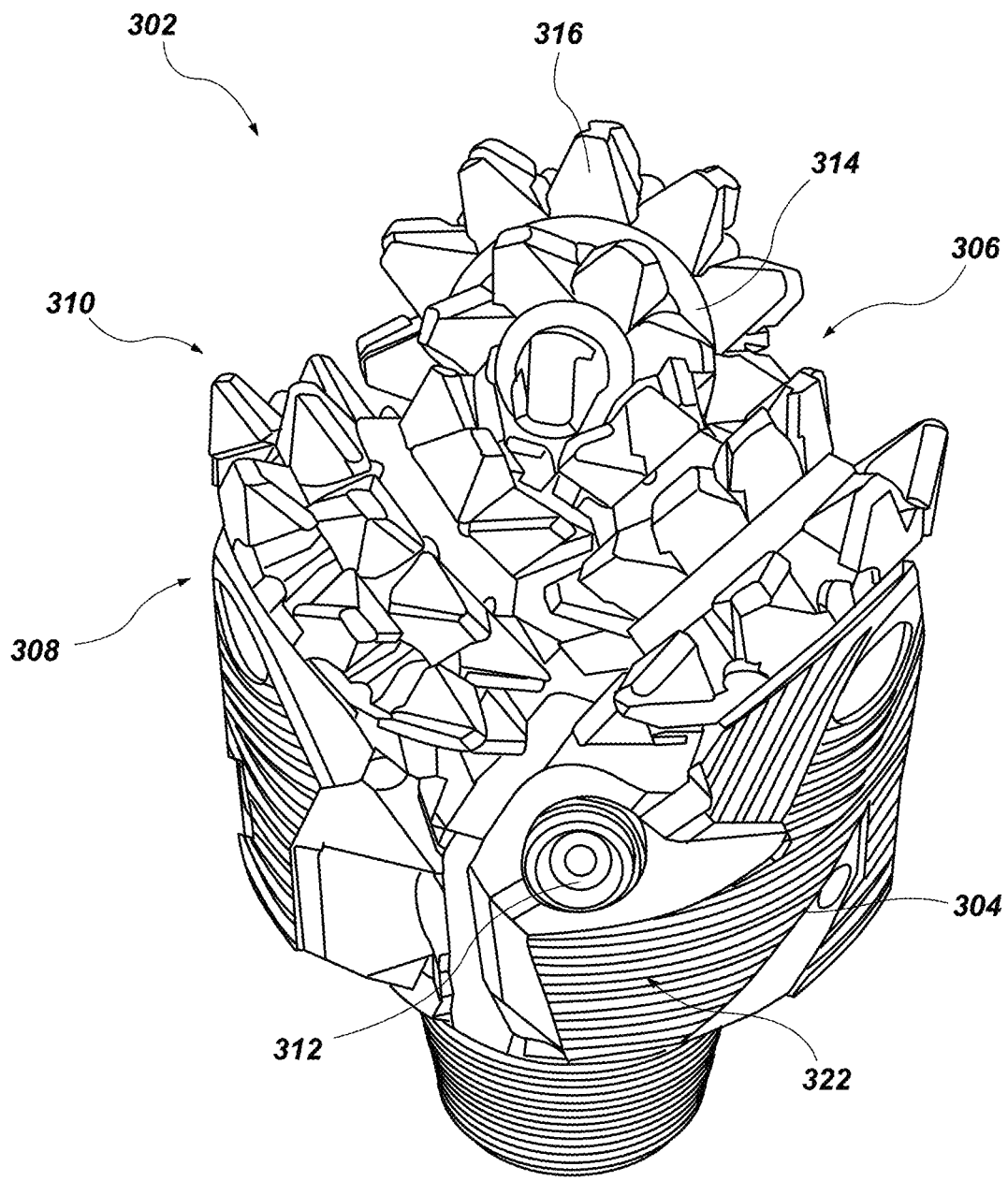
FIG. 5 illustrates a perspective view of a downhole earth-boring rotary drill bit in accordance with an embodiment of the present disclosure.

FIGS. 3-4 illustrate another embodiment of the downhole earth-boring rotary drill bit 100 as a polycrystalline diamond compact (PDC) bit 202. The PDC bit 202 may comprise a bit body 204, a crown region 206 located at a first end 208 of the bit body 204, a plurality of blades 210 disposed over the crown region 206, and fluid passageways 212 passing through the internal structure of the PDC bit 202. The PDC bit 202 is configured to be a reusable bit.

Figure 6:
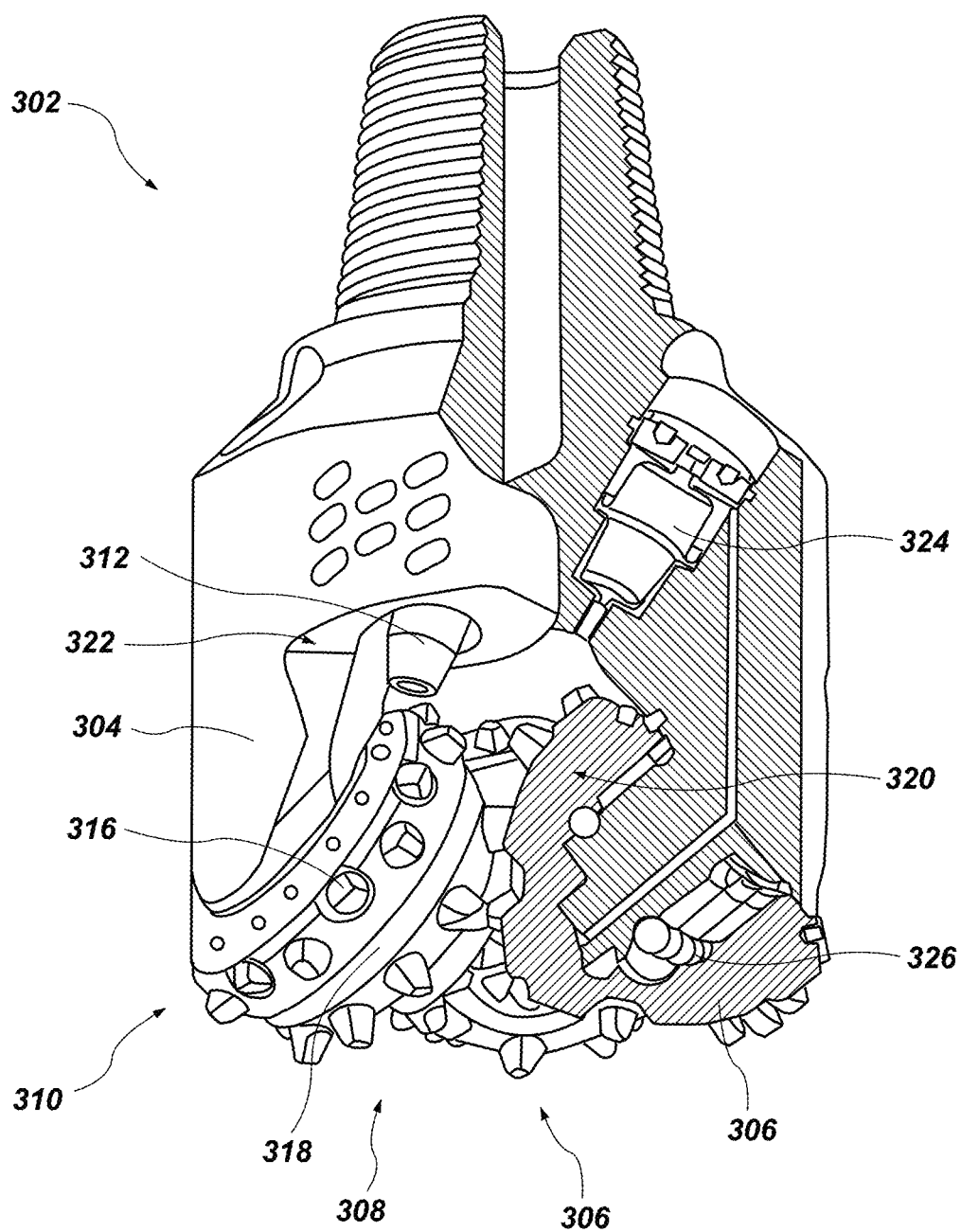
FIG. 6 illustrates a perspective, partial cross-sectional view of the downhole earth-boring rotary drill bit of FIG. 5.
Figure 7:
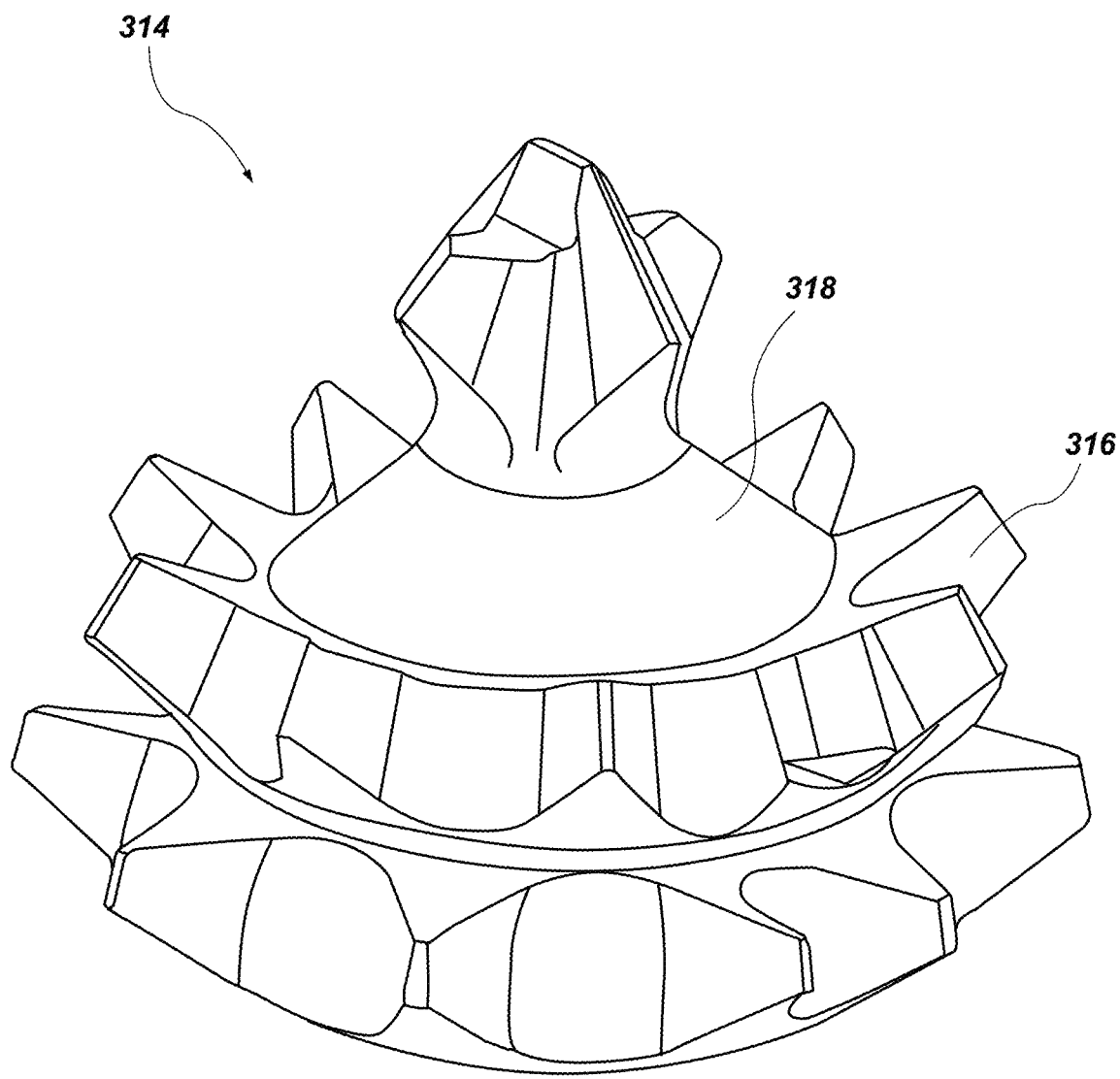
FIG. 7 illustrates a perspective view of a cone of the downhole earth-boring rotary drill bit of FIG. 5.

FIGS. 5-8 illustrate another embodiment of the downhole earth-boring rotary drill bit 100 as a rolling cone bit 302. The rolling cone bit 302 may, for example, be a milled-tooth bit or a tungsten carbide insert bit. The rolling cone bit 302 may include a bit leg 304, a plurality of cones 306 disposed over a crown region 308 at a first end 310 of the bit leg 304, and fluid passageway 312. Each cone 314 of the plurality of cones 306 includes a plurality of teeth 316 disposed over an outer surface 318 of the plurality of cones 306. The plurality of teeth 316 may be, for example, milled teeth or tungsten carbide inserts. As shown in FIG. 6, the rolling cone bit 302 may include a pressure compensation system 324 and a bearing 326 configured to facilitate movement of each cone 314 relative to the bit leg 304. The rolling cone bit 302 is configured to be a reusable bit.

The embodiments of the downhole earth-boring rotary drill bit 100 shown in FIGS. 1-8 are configured to attach to a shank 126 (shown in FIGS. 3 and 4). A first end 128 of the shank 126 is configured to attach to the downhole earth-boring rotary drill bit 100. A second end 130 of the shank 126 may include a threaded portion 132. The threaded portion 132 may secure the downhole earth-boring rotary drill bit 100 to another portion of a drill string. The shank 126 may also include a fluid passageway 134. The fluid passageway 134 is configured to be in fluid communication with the one or more fluid passageways 112, 212, 312 of the downhole earth-boring rotary drill bit 100.

During operation, the downhole earth-boring rotary drill bit 100 will experience wear on different portions of the downhole earth-boring rotary drill bit 100 depending, for example, on the type of downhole earth-boring rotary drill bit 100, the length of time the downhole earth-boring rotary drill bit 100 is in operation, the type of material being drilled by the downhole earth-boring rotary drill bit 100, and the material composition of the downhole earth-boring rotary drill bit 100 itself. In some cases, a portion of the downhole earth-boring rotary drill bit 100 may be broken or damaged after enough wear or stress from operation of the downhole earth-boring rotary drill bit 100 which may cause the downhole earth-boring rotary drill bit 100 to not function as designed.

In some embodiments, the downhole earth-boring rotary drill bit 100 may be repaired using an additive manufacturing method. For example, multi-use bits such as the PDC bit 202 and the rolling cone bit 302 may be damaged during normal operation of the downhole earth-boring rotary drill bit 100. The portion of the downhole earth-boring rotary drill bit 100 that is damaged may be identified by a computer analysis or by identification by a person. Through additive manufacturing the portion of the downhole earth-boring rotary drill bit 100 that is damaged can be repaired to have original, as-built characteristics or may be repaired to have improved properties to prevent another, similar failure. Other components of the drill string may be damaged during operation of an earth-boring system such as the shank 126. The shank 126 may also be repaired using additive manufacturing.

Identifying the area of the downhole earth-boring rotary drill bit 100 to be repaired may be done manually or with the aid of a computer. For example, the PDC bit 202 (FIGS. 3-4) may be analyzed to identify one or more areas of the bit body 204, crown region 206, plurality of blades 210, or the fluid passageway 212 that are damaged. The damage to the PDC bit 202 may be a crack, a portion of the PDC bit 202 that is sheared off, general wearing down of a surface over time, or another physical defect. Through an additive manufacturing method, additional material is added to the damaged portion of the PDC bit 202 and the PDC bit 202 may be built up, substantially to its original, as-built dimensions. Similarly, the rolling cone bit 302 (FIGS. 5-8) may be analyzed to identify one or more areas of the bit leg 304, plurality of cones 306, crown region 308, fluid passageways 312, plurality of teeth 316, or the outer surface 318 that are damaged. The damage to the rolling cone bit 302 may be a crack, a portion of the rolling cone bit 302 that is sheared off, general wearing down of a surface over time, or another physical defect. Through an additive manufacturing method, additional material is added to the damaged portion of the rolling cone bit 302 and the rolling cone bit 302 may be built up, substantially to its original, as-built dimensions.

In some embodiments, a portion of the shank 126 or other component of the drill string may be identified to be repaired using additive manufacturing. For example, the threaded portion 132 of the shank 126 may be damaged during operation of the downhole earth-boring rotary drill bit 100. Through manual analysis or computer aided analysis, the area of the threaded portion 132 of the shank 126 or a portion of any other component may be identified for repair. Through an additive manufacturing method, additional material is added to the identified, damaged portion of the threaded portion 132 of the shank 126 or the portion of any other component and the damaged portion of the threaded portion 132 of the shank 126 or the portion of any other component may be built up, substantially to its original, as-built dimensions.

In some embodiments, the downhole earth-boring rotary drill bit 100 may be formed entirely using an additive manufacturing method. Using any one of the additive manufacturing techniques discussed herein, the downhole earth-boring rotary drill bit 100 may be formed with two or more materials. In some embodiments the additive manufacturing techniques may use at least three types of materials with different properties. Specific material selection may differ depending on which portion of the downhole earth-boring rotary drill bit 100 is being formed and the intended application of the downhole earth-boring rotary drill bit 100. For example, referring to the casing bit 102 shown in FIGS. 1-2, the bit body 104 may be substantially formed of a first material. The crown region 106 and the plurality of blades 110 may be formed at least partially of a second material having different chemical composition and properties than the first material. In some embodiments, the bit body 104 may include a third material disposed within the bit body 104 defining the fluid passageways 112. The first material may be one that is a relatively cheaper material than the second material or third material such as a low alloy steel. The second material may be one that exhibits higher strength and impact toughness than the first material such as high alloy steels, or other non-ferrous alloys. The third material may be one that exhibits higher wear and corrosion resistant properties than the first material such as cobalt-chromium alloys (i.e., Stellites). Distinctness of the chemical composition of the first material, the second material and the third material may vary depending on the desired properties of the downhole earth-boring rotary drill bit 100. Material selection for the first material, the second material, and the third material is discussed in further detail below.

Referring to the PDC bit 202 of FIGS. 3-4, the bit body 204 may be substantially formed of a first material. The crown region 206 and the plurality of blades 210 may be formed at least partially of a second material having different properties than the first material. In some embodiments, the bit body 204 may include a third material disposed within the bit body 204 around the fluid passageways 212. The first material, the second material, and the third material forming the PDC bit 202 may exhibit substantially the same properties as the first material, the second material, and the third material forming the casing bit 102.

Referring to the rolling cone bit 302 of FIGS. 5-8, the bit leg 304 and the plurality of cones 306 may be substantially formed of a first material. The crown region 308 and the plurality of teeth 316 may be formed at least partially of a second material having different properties than the first material. In some embodiments, the bit leg 304 may include a third material disposed within the bit leg 304 around the fluid passageways 312. The first material, the second material, and the third material forming the rolling cone bit 302 may exhibit substantially the same properties as the first material, the second material, and the third material forming the casing bit 102.

Additive manufacturing methods allow for the first material, second material, and the third material to be used to form the downhole earth-boring rotary drill bit 100 in the same process. For example, the transition from using the first material, the second material and the third material may be continuous during the additive manufacturing process. As discussed above, each material may be disposed over a specific area depending on the expected conditions that the area will be exposed to during operation of the drill string. In some embodiments, there may be more than three materials used to form the downhole earth-boring rotary drill bit 100.

The additive manufacturing method may use electron beam additive manufacturing (EBAM), wire-arc additive manufacturing (WAAM), wire-laser additive manufacturing (WLAM), or a similar method. Forming the downhole earth-boring rotary drill bit 100 through EBAM, WAAM, or WLAM methods reduces the time it takes to form the downhole earth-boring rotary drill bit 100 compared to traditional methods of subtractive manufacturing. In addition to reducing production time, additive manufacturing reduces the overall material cost by not needing to form forged blanks from which the downhole earth-boring rotary drill bit 100 is then machined. Wire feed stock for additive manufacturing is easier to source and transport than forged from blanks which also reduces overall production cost of the downhole earth-boring rotary drill bit 100. Additive manufacturing may also facilitate easier production of internal cavities within the downhole earth-boring rotary drill bit 100.

In some embodiments, the method of forming the downhole earth-boring rotary drill bit 100 may also include surface finishing after the downhole earth-boring rotary drill bit 100 is formed. Additive manufacturing methods allow for the downhole earth-boring rotary drill bit 100 to be formed to near net shape reducing the post machining processes. In some embodiments, surface finishing may further improve the functional efficiency of the downhole earth-boring rotary drill bit 100 and reduce the likelihood of failure or damage to the downhole earth-boring rotary drill bit 100. In some embodiments, the final surface finish of the downhole earth-boring rotary drill bit 100 may be within 2-5 mm which may be achievable through only the additive manufacturing methods.

The additive manufacturing methods using the first material, the second material, and the third material facilitate the forming of material gradients within the downhole earth-boring rotary drill bit 100. As shown in FIG. 2, the casing bit 102 includes a first gradient. The first gradient may be located at region 136 and may at least partially include the crown region 106 and/or the plurality of blades 110 of the casing bit 102. The first gradient may include a transition from the first material forming the bit body 104 to the second material forming the plurality of blades 110 and/or the crown region 106 of the casing bit 102. For example, if the first material is 4130 steel, a transition in content of chromium or carbon may be defined across the first gradient. The first material may be 4130 steel with a first content of chromium, carbon, or another element and the second material may also be 4130 steel but with a second content of chromium, carbon, or another element that is similar to but different from the first content of the first material. In some embodiments, the first material and the second material may not be similar in chemical composition. The first gradient may include a "buttering" layer in between to allow the two chemically distinct materials that could not previously be combined to bond together. These characteristics may be applied to the other gradients of the downhole earth-boring rotary drill bit 100 discussed herein. The first gradient may define the transition from substantially 100% of the first material forming the bit body 104 to substantially 100% of the second material forming the plurality of blades 110 or the crown region 106. In some embodiments, the first gradient may define the transition from substantially 100% of the first material forming the bit body 104 to substantially a combination of the first material and the second material forming the plurality of blades 110 or the crown region 106. For example, the transition may be from substantially 100% of the first material to about 50% of the first material and about 50% of the second material or any combination therebetween such as about 40% of the first material and about 60% of the second material, about 30% of the first material and about 70% of the second material, about 20% of the first material and about 80% of the second material, or about 10% of the first material and about 90% of the second material.

Referring to FIG. 4, the first gradient may also be applied to the PDC bit 202. The first gradient may be located at region 214 and may include the crown region 206 and/or the plurality of blades 210 of the PDC bit 202. The first gradient may include a transition from the first material forming the bit body 204 to the second material forming the plurality of blades 210 and/or the crown region 206 of the PDC bit 202. The first gradient may define the transition from substantially 100% of the first material forming the bit body 204 to substantially 100% of the second material forming the plurality of blades 210 or the crown region 206. In some embodiments, the first gradient may define the transition from substantially 100% of the first material forming the bit body 204 to substantially a combination of the first material and the second material forming the plurality of blades 210 or the crown region 206. For example, the transition may be from substantially 100% of the first material to about 50% of the first material and about 50% of the second material or any combination therebetween such as about 40% of the first material and about 60% of the second material, about 30% of the first material and about 70% of the second material, about 20% of the first material and about 80% of the second material, or about 10% of the first material and about 90% of the second material.

The PDC bit 202 may include the second gradient. The second gradient is located at region 216 and at least partially surrounds the fluid passageway 212. The second gradient may include a transition from the first material forming the bit body 204 to the third material defining the fluid passageway 212, or fluid passageway 134 of the PDC bit 202. The second gradient may define the transition from substantially 100% of the first material forming the bit body 204 to substantially 100% of the third material defining the inner surface the fluid passageway 212, or fluid passageway 134. In some embodiments, the second gradient may define the transition from substantially 100% of the first material forming the bit body 204 to a combination of the first material and the third material defining the inner surface of the fluid passageway 212, or fluid passageway 134. For example, the transition may be from substantially 100% of the first material to about 50% of the first material and about 50% of the third material or any combination therebetween such as about 40% of the first material and about 60% of the third material, about 30% of the first material and about 70% of the third material, about 20% of the first material and about 80% of the third material, or about 10% of the first material and about 90% of the third material.

Figure 8:
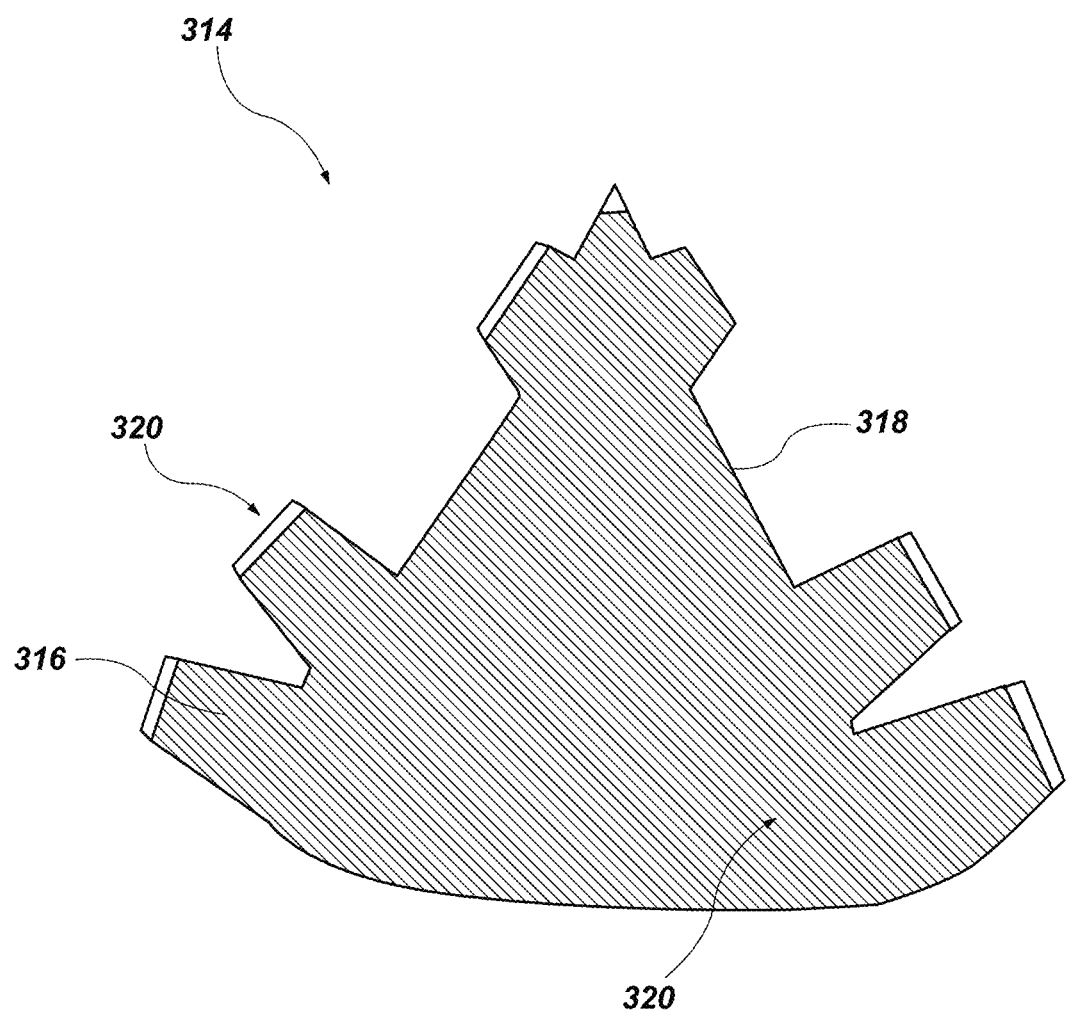
FIG. 8 illustrates a cross-sectional view of the downhole earth-boring rotary drill bit of FIG. 7.

Referring to FIGS. 6 and 8, the first gradient may be applied to the plurality of cones 306 of the rolling cone bit 302. The first gradient may be located at region 320 which at least partially includes the outer surface 318 and/or the plurality of teeth 316 of the cone 314. The first gradient may include a transition from the first material forming the cone 314 to the second material forming the outer surface 318 and/or the plurality of teeth 316 of the rolling cone bit 302. The first gradient may define the transition from substantially 100% of the first material forming the cone 314 to substantially 100% of the second material forming the outer surface 318 and/or the plurality of teeth 316. In some embodiments, the first gradient may define the transition from substantially 100% of the first material forming the cone 314 to substantially a combination of the first material and the second material forming the outer surface 318 and/or the plurality of teeth 316. For example, the transition may be from substantially 100% of the first material to about 50% of the first material and about 50% of the second material or any combination therebetween such as about 40% of the first material and about 60% of the second material, about 30% of the first material and about 70% of the second material, about 20% of the first material and about 80% of the second material, or about 10% of the first material and about 90% of the second material.

The rolling cone bit 302 may include the second gradient. The second gradient is located at region 322 (shown in FIGS. 5 and 6) which may be located internally in the bit leg 304 and at least partially surround the fluid passageway 312. The second gradient may include a transition from the first material forming the bit leg 304 to the third material defining the fluid passageway 312 of the rolling cone bit 302. The second gradient may define the transition from substantially 100% of the first material forming the bit leg 304 to substantially 100% of the third material defining the inner surface the fluid passageway 312. In some embodiments, the second gradient may define the transition from substantially 100% of the first material forming the bit leg 304 to a combination of the first material and the third material defining the inner surface the fluid passageway 312. For example, the transition may be from substantially 100% of the first material to about 50% of the first material and about 50% of the third material or any combination therebetween such as about 40% of the first material and about 60% of the third material, about 30% of the first material and about 70% of the third material, about 20% of the first material and about 80% of the third material, or about 10% of the first material and about 90% of the third material.

As shown in FIG. 4, the shank 126 may include a third gradient. The third gradient may be located at region 140 and may at least partially include the threaded portion 132 of the shank 126. The third gradient may include a transition from the first material forming the shank 126 to a fourth material forming the threaded portion 132 of the shank 126. The third gradient may define the transition from substantially 100% of the first material forming the shank 126 to substantially 100% of the fourth material forming the threaded portion 132. In some embodiments, the third gradient may define the transition from substantially 100% of the first material forming the shank 126 to substantially a combination of the first material and the fourth material forming the threaded portion 132. For example, the transition may be from substantially 100% of the first material to about 50% of the first material and about 50% of the fourth material or any combination therebetween, such as about 40% of the first material and about 60% of the fourth material, about 30% of the first material and about 70% of the fourth material, about 20% of the first material and about 80% of the fourth material, or about 10% of the first material and about 90% of the fourth material. The fourth material may be one that exhibits resistance to galling and is non-magnetic, such as nitronic 60 (alloy 218).

The first material may be a low alloy steel such as 4130, 4140, 9310, 8620, 8720, 8630, or a similar steel or other metal-based alloy. The second material may be a high hardenability steel, a stainless steel (ex. 17-4PH, Alloy 218, Alloy 316), a maraging steel (ex. 18Ni(250)), a copper-based alloy (brasses or bronzes), or a similar material that exhibits higher impact resistance and/or strength properties than the first material. The third material may be a Ni-based alloy, such as Inconel 625, Inconel 718, a copper-based alloy (brasses or bronzes), a cobalt-chromium alloy (Stellites), metal matrix composite (hard material particles dispersed in metal alloy matrix), or a similar alloy that exhibits higher corrosion, temperature, and/or wear resistant properties than the first material. The first material, the second material, the third material and the fourth material may all be supplied for the additive manufacturing methods as a wire-stock material. A "buttering," or transition layer, of a compatible material may be deposited between any combination of first, second, third, or fourth material depending on how chemically dissimilar the two materials are, as is often required to join dissimilar metals in traditional welding processes.

The additive manufacturing methods of repairing the downhole earth-boring rotary drill bit 100 or forming the downhole earth-boring rotary drill bit 100 may all be automated by a computer system, requiring no input once the additive manufacturing process has begun.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternate useful combinations of the elements described, will become apparent to those skilled in the art from the description. Such modifications and embodiments also fall within the scope of the appended claims and equivalents.

What is claimed is:

1. A downhole earth-boring rotary drill bit, comprising:
   a bit body, comprising:
   a crown region;
   a plurality of cutting elements on the crown region;
   wherein the bit body comprises a first gradient of a first material and a second material between an external surface of the crown region and an internal structure of the bit body; and
   a third material defining one or more fluid passageways located internally within the bit body, wherein the bit body comprises a second gradient of the first material and the third material, the first material differs from the second material and the third material differs from both the first material and the second material.

2. The drill bit of claim 1, wherein at least one material of the first material gradient facilitates at least one of improved strength or impact toughness compared to the internal structure of the bit body.

3. The drill bit of claim 1, further comprising a plurality of blades on the crown region, wherein the plurality of blades comprises the first gradient from an exterior surface of the bit body to the internal structure of the bit body.

4. The drill bit of claim 1, wherein at least one material of the second material gradient facilitates at least one of corrosion resistance, wear resistance, or temperature resistance compared to the internal structure of the bit body.

5. The drill bit of claim 1, further comprising a shank configured to connect the bit body to a drill string; wherein the shank comprises a third material gradient of the first material and the second material between a threaded portion of the shank and an internal structure of the shank.

6. The drill bit of claim 5, wherein at least one material of the third material gradient facilitates resistance to galling compared to the internal structure of the shank.

7. The drill bit of claim 5, wherein the bit body and the shank are one continuous body.

8. The drill bit of claim 1, wherein the bit body is one of a polycrystalline diamond compact bit, a rolling cone bit, or a casing bit.

9. The drill bit of claim 1, wherein the third material exhibits higher wear and corrosion resistance properties than the first material.

10. A method of repairing a downhole earth-boring rotary drill bit, the method comprising:
    identifying one or more areas of the downhole earth-boring rotary drill bit to be repaired, the downhole earth-boring rotary drill bit comprising a bit body comprising a crown region and a plurality of cutting elements on the crown region;
    selecting a first material and a second material to be used to form at least a portion of the downhole earth-boring rotary drill bit;
    disposing a first gradient of the first material and the second material over the one or more areas of the downhole earth-boring rotary drill bit to be repaired, wherein the first gradient is between an external surface of the crown region and an internal structure of the bit body;
    selecting a third material, the third material defining one or more fluid passageways located internally within the bit body, the first material differs from the second material and the third material differs from both the first material and the second material; and
    disposing a second gradient of the first material and the third material internally within the bit body.

11. The method of claim 10, wherein disposing the first gradient of the first material and the second material comprises using directed energy deposition to dispose the first material and the second material over the one or more areas of the downhole earth-boring rotary drill bit to be repaired.

12. The method of claim 11, wherein using directed energy deposition to dispose the first material and the second material comprises electron beam additive manufacturing, wire arc additive manufacturing, or laser-based additive manufacturing.

13. The method of claim 12, wherein selecting the first material and the second material comprises selecting at least two different types of wire-stock to be used to form at least a portion of the downhole earth-boring rotary drill bit.

14. The method of claim 10, wherein selecting the first material and the second material comprises selecting at least one material that facilitates at least one of improved strength or impact toughness compared to the internal structure of a bit body.

15. The method of claim 10, wherein selecting the first material and the second material comprises selecting at least one material that facilitates at least one of improved wear resistance or corrosion resistance compared to the internal structure of a bit body.

16. The method of claim 10, wherein identifying the one or more areas of an earth-boring tool body to be repaired comprises identifying at least a portion of a blade of a polycrystalline diamond compact bit to be repaired or at least a portion of a steel-tooth bit to be repaired.

17. A method of forming a downhole earth-boring rotary drill bit, the method comprising:

identifying a structure of the rotary drag bit to be printed by an additive manufacturing process;

selecting a first material and a second material to be used to form at least a portion of the downhole earth-boring rotary drill bit;

disposing the first material and the second material in a layered pattern representing at least a portion of the downhole earth-boring rotary drill bit, the downhole earth-boring rotary drill bit comprising a bit body comprising a crown region and a plurality of cutting elements on the crown region;

wherein the layered pattern forms a first material gradient as more layers are added to the layered pattern, wherein the first gradient is between an external surface of the crown region and an internal structure of the bit body;

selecting a third material to define one or more fluid passageways located internally within the bit body, the first material differs from the second material and the third material differs from both the first material and the second material; and disposing the first material and the third material to form a second gradient.

18. The method of claim 17, wherein the downhole earth-boring rotary drill bit is one of a polycrystalline diamond compact bit, a rolling cone bit, or a casing bit.

19. The method of claim 17, wherein selecting the first material and the second material comprises selecting at least two types of wire stock.

20. The method of claim 17, wherein disposing the first material and the second material in a layered pattern comprises using directed energy deposition.

\* \* \* \* \*